United States Patent
Hsu (10) Patent No.: US 11,449,416 B2
(45) Date of Patent: Sep. 20, 2022

(54) APPARATUS AND METHOD AND COMPUTER PROGRAM PRODUCT FOR HANDLING FLASH PHYSICAL-RESOURCE SETS

(71) Applicant: Silicon Motion, Inc., Zhubei (TW)

(72) Inventor: Che-Wei Hsu, Taichung (TW)

(73) Assignee: SILICON MOTION, INC., Zhubei (TW)

( * ) Notice: Subject to any disclaimer, the term of this patent is extended or adjusted under 35 U.S.C. 154(b) by 352 days.

(21) Appl. No.: 16/732,944

(22) Filed: Jan. 2, 2020

(65) Prior Publication Data
US 2020/0401509 A1    Dec. 24, 2020

Related U.S. Application Data

(60) Provisional application No. 62/864,569, filed on Jun. 21, 2019.

(30) Foreign Application Priority Data

Sep. 27, 2019 (CN) .......................... 201910925890.X (51) Int. Cl.
     *G06F 12/02*      (2006.01)
     *G06F 13/16*      (2006.01)
     (Continued)

(52) U.S. Cl.
CPC ........ *G06F 12/0246* (2013.01); *G06F 7/5443* (2013.01); *G06F 11/1004* (2013.01);
(Continued)

(58) Field of Classification Search
CPC ............. G06F 12/0246; G06F 12/0882; G06F 7/5443; G06F 11/1004; G06F 13/1673; G06F 2212/7201; G06F 2212/7207
See application file for complete search history.

(56) References Cited

U.S. PATENT DOCUMENTS 5,963,983 A    10/1999   Sakakura et al.
7,890,693 B2    2/2011   Yang et al.
(Continued)

FOREIGN PATENT DOCUMENTS

TW      I316721      11/2009
TW      I395100 B1    5/2013
(Continued)

OTHER PUBLICATIONS

Ma, Dongzhe, Jianhua Feng, and Guoliang Li. "A survey of address translation technologies for flash memories." ACM Computing Surveys (CSUR) 46.3 (2014): 1-39. (Year: 2014).*
(Continued)

*Primary Examiner* — Kalpit Parikh
(74) *Attorney, Agent, or Firm* — Birch, Stewart, Kolasch & Birch, LLP (57) ABSTRACT

The invention introduces an apparatus for handling flash physical-resource sets, at least including a random access memory (RAM), a processing unit and an address conversion circuit. The RAM includes multiple segments of temporary space and each segment thereof stores variables associated with a specific flash physical-resource set. The processing unit accesses user data of a flash physical-resource set when executing program code of a Flash Translation Layer (FTL). The address conversion circuit receives a memory address issued from the FTL, converts the memory address into a relative address of one segment of temporary space associated with the flash physical-resource set and outputs the relative address to the RAM for accessing a variable of the associated segment of temporary space.

17 Claims, 6 Drawing Sheets

(51) Int. Cl.
G06F 12/0882 (2016.01)
G06F 11/10 (2006.01)
G06F 7/544 (2006.01)

(52) U.S. Cl.
CPC ...... G06F 12/0882 (2013.01); G06F 13/1673 (2013.01); *G06F 2212/7201* (2013.01); *G06F 2212/7207* (2013.01)

(56) References Cited

U.S. PATENT DOCUMENTS

| | | | |
|---|---|---|---|
| 2008/0098195 | A1 | 4/2008 | Cheon et al. |
| 2008/0183955 | A1 | 7/2008 | Yang et al. |
| 2010/0180071 | A1 | 7/2010 | Hsu et al. |
| 2012/0066447 | A1* | 3/2012 | Colgrove ............... G06F 3/0634 711/E12.001 |
| 2013/0031169 | A1 | 11/2013 | Cheng et al. |
| 2014/0208003 | A1 | 7/2014 | Cohen |
| 2016/0342545 | A1* | 11/2016 | Arai ..................... G06F 11/0727 |
| 2018/0247948 | A1* | 8/2018 | Kanno ............... H01L 27/11524 |

FOREIGN PATENT DOCUMENTS

| | | |
|---|---|---|
| TW | I514260 B | 12/2015 |
| TW | I609263 B | 12/2017 |

OTHER PUBLICATIONS

Taiwanese Search Report for Taiwanese Application No. 108135062, dated Sep. 28, 2020.

* cited by examiner

APPARATUS AND METHOD AND COMPUTER PROGRAM PRODUCT FOR HANDLING FLASH PHYSICAL-RESOURCE SETS

CROSS-REFERENCE TO RELATED APPLICATIONS

This application claims the benefit of priority to U.S. Provisional Application Ser. No. 62/864,569, filed on Jun. 21, 2019; and Patent Application No. 201910925890.X, filed in China on Sep. 27, 2019; the entirety of which is incorporated herein by reference for all purposes.

BACKGROUND

The disclosure generally relates to storage devices and, more particularly, to apparatus and method and computer program product for handling flash physical-resource sets.

Flash memory devices typically include NOR flash devices and NAND flash devices. NOR flash devices are random access a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, a central processing unit (CPU) has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

In the current flash specification, physical resources of a flash device being shared by all applications may lead to a block of an application from accessing a physical resource of the flash device when another application occupies the same one, therefore, the overall system performance is degraded. The flash specification of next-generation, such as Non-Volatile Memory Express (NVMe) 1.4, separates flash physical-resources into multiple sets and each set includes a portion of channels and Logical Unit Numbers (LUNs). Each of different applications can only perform operations, such as reads, writes, erases, etc., to one permitted set of physical resources, so as to improve the system performance by reducing the probability of cross-blocks. It is required to re-design firmware of a flash controller to support the new features. However, poor-designed firmware may result in difficult maintenance of program code, and even worse, occurrences of unexpected errors in executions. Thus, it is desirable to have an apparatus, a method and a computer program product for handling flash physical-resource sets, so as to address the aforementioned problems.

SUMMARY

In an aspect of the invention, an embodiment introduces an apparatus for handling flash physical-resource sets, at least including a random access memory (RAM), a processing unit and an address conversion circuit. The RAM includes multiple segments of temporary space and each segment thereof stores variables associated with a specific flash physical-resource set. The processing unit accesses user data of a flash physical-resource set when executing program code of a Flash Translation Layer (FTL). The address conversion circuit receives a memory address issued from the FTL, converts the memory address into a relative address of one segment of temporary space associated with the flash physical-resource set and outputs the relative address to the RAM for accessing a variable of the associated segment of temporary space.

In another aspect of the invention, an embodiment introduces a method for handling flash physical-resource sets, performed by a processing unit when loading and executing program code of an FTL, at least including: during a performance of an operation, after writing a number corresponding to a physical-resource set into a set-selection register of an address conversion circuit, sending a memory address for a variable value to be read or written into the address conversion circuit, thereby enabling the address conversion circuit to convert the memory address into a relative address corresponding to allocated space for the physical-resource set and output the relative address to a RAM; and reading the variable value from the relative address of the RAM, or writing the variable value into the relative address of the RAM.

In still another aspect of the invention, an embodiment introduces a non-transitory computer program product for handling flash physical-resource sets when executed by a processing unit, including program code of an FTL to: during a performance of an operation, after writing a number corresponding to a physical-resource set into a set-selection register of an address conversion circuit, send a memory address for a variable value to be read or written into the address conversion circuit, thereby enabling the address conversion circuit to convert the memory address into a relative address corresponding to allocated space for the physical-resource set and output the relative address to a RAM; and read the variable value from the relative address of the RAM, or writing the variable value into the relative address of the RAM.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
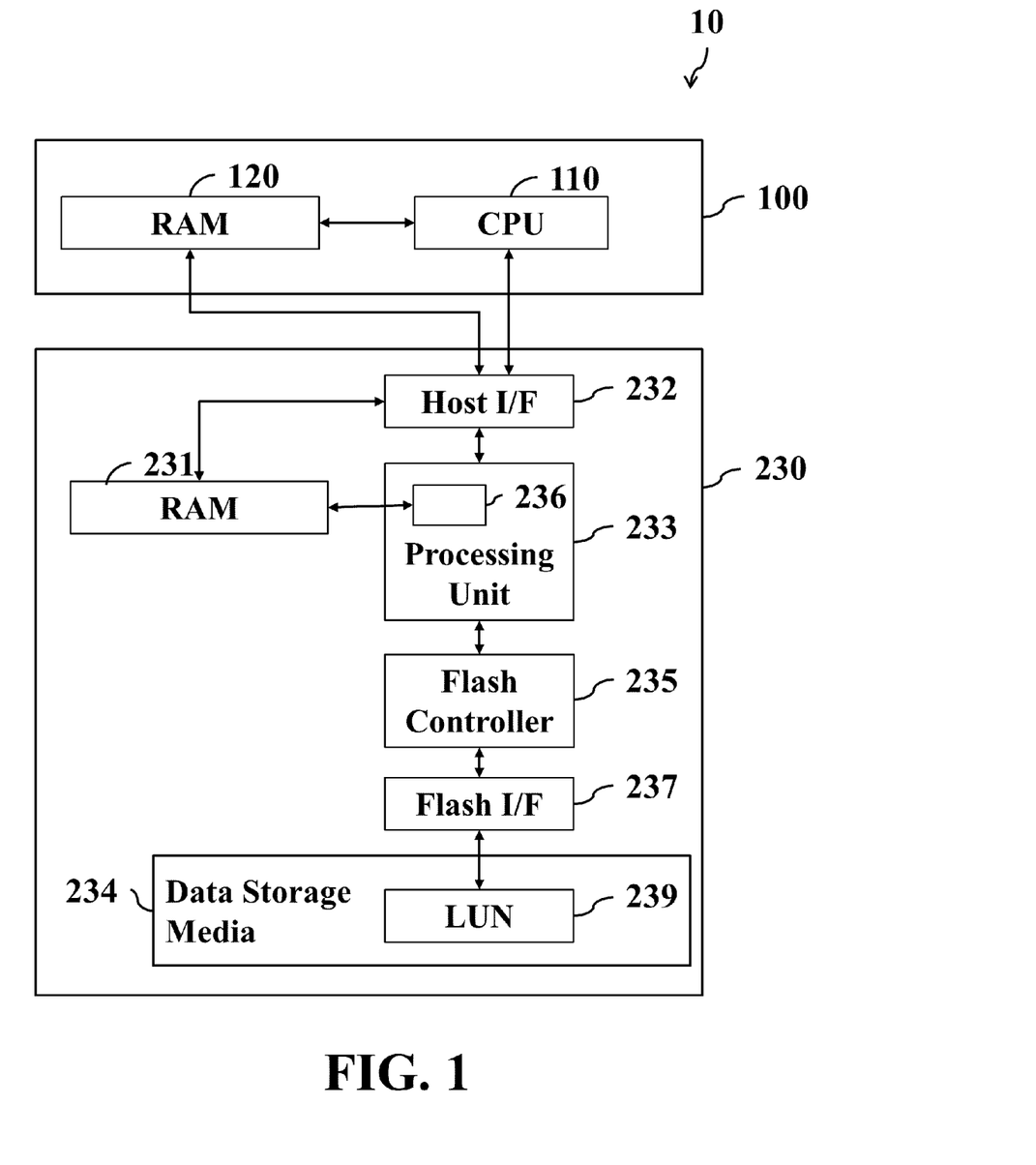
FIG. 1 is the system architecture of a flash memory device according to an embodiment of the invention.

Refer to FIG. 1. The electronic apparatus 10 includes a host 100 and a storage device 230. The host 100 mainly includes a central processing unit (CPU) 110 and a Random Access Memory (RAM) 120. The electronic apparatus 10 may be, for example, practiced in a Personal Computer (PC), a laptop PC, a notebook, a mobile phone, a digital camera, a digital recorder, or other consumer electronic products. Specified regions of the RAM 120 may be allocated for data buffers, queues, or others. A specified region of the RAM 120 may be allocated for a data buffer.

The storage device 230 may include a processing unit 233 and data storage media 234, and be optionally equipped with a RAM 231 for improving the performance of the storage device 230. The processing unit 233 may receive commands from the CPU 110 through a host interface (I/F) 232 and instruct a flash controller 235 to perform data reads, data writes, block erases, or others, accordingly. The host I/F 232 may be compatible with or support a communications protocol, such as Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), etc., and their extensions. Any of the CPU 110 and the processing unit 233 may be implemented in numerous ways, such as with general-purpose hardware (e.g., a single processor, multiple processors or graphics processing units capable of parallel computations, or others) that is programmed using firmware or software instructions to perform the functions recited herein. The processing unit 233 further includes a memory controller 236 for controlling operations of the RAM 231, thereby enabling the processing unit 233 to store necessary data in execution, such as variables, data tables, data abstracts, or others, in the RAM 231.

The data storage media 234 may be composed of multiple Logical Unit Numbers (LUNs) 239. A flash controller 235 may communicate with the data storage media 234 via the flash I/F 237, and specifically, the flash I/F 237 may be compatible with or support a Double Data Rate (DDR) protocol, such as Open NAND Flash Interface (ONFI), DDR toggle, or others. The flash controller 235 of the storage device 230 writes user data into a designated address (a destination address) of the data storage media 234 and reads user data from a designated address (a source address) thereof through the flash I/F 237. The flash I/F 237 may use several electronic signals including a data line, a clock signal line and control signal lines for coordinating command and data transfer between the flash controller 235 and the data storage media 234. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc. The processing unit 233 and the flash controller 235 may be implemented in separate chips or integrated into a single chip.

The LUNs 239 provide huge storage space typically in Gigabytes, or even Terabytes, for storing a wide range of user data, such as high-resolution images, video files, etc. The LUNs 239 include control circuits and memory arrays containing memory cells, such as Triple Level Cells (TLCs) or Quad-Level Cells (QLCs).

The RAM 231 may be used to buffer user data, which is instructed by the CPU 110, that is to be programmed into the LUN 239 and has been read from the LUN 239 but hasn't been clocked out to the CPU 110, and Logical-Physical mapping (L2P) tables for fast lookup. The RAM 231 may additionally store necessary data in execution of software and firmware instructions, such as variables, data tables, data abstracts, or others. The RAM 231 may include a Static Random Access Memory (SRAM), a Dynamic Random. Access Memory (DRAM), or both.

Figure 2:
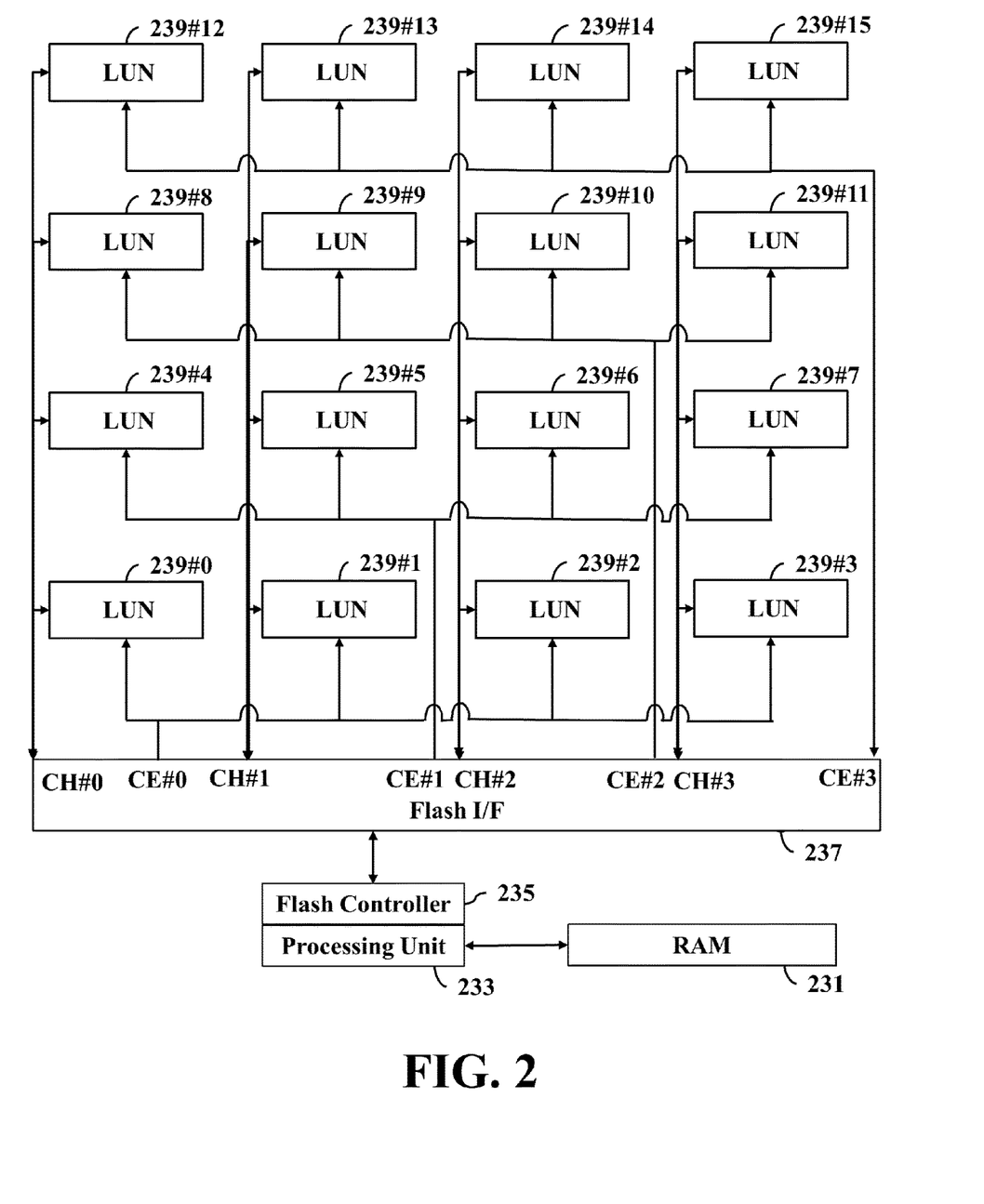
FIG. 2 is a schematic diagram illustrating Logical Unit Numbers (LUNs) connecting to a flash interface.

Refer to FIG. 2. The flash I/F 237 may include four I/O channels (hereinafter referred to as channels) CH #0 to CH #3 each is connected to three LUNs, for example, the channel CH #0 is connected to the LUNs 239 #0, 239 #4, 239 #8 and 239 #12. One die may include one LUN 239 or more, and each LUN 239 may be controlled by a designated CE signal. Thus, the flash controller 235 may drive the flash I/F 237 to issue one of the CE signals CE #0 to CE #3 to activate the LUNs 239 #0 to 239 #3, the LUNs 239 #4 to 239 #7, the LUNs 239 #8 to 239 #11, or the LUNs 239 #12 to 239 #15, and read data from or program data into the activated LUNs in parallel.

In the new flash standard, the channels and LUNs 239 can be separated into multiple physical-resource sets (hereinafter referred to as sets for brevity) and a portion of channels and LUNs 239 are included in each set. Multiple sets operate independently and are managed separately from each other. For example, the physical resources may be divided into three sets: The set Set #0 includes the channels CH #0 and CH #1, and LUNs 239 #0~1, 239 #4~5, 239 #8~9 and 239 #12~13; the set Set #1 includes the channel CH #2 and LUNs 239 #2, 239 #6, 239 #10 and 239 #14; and the set Set #2 includes the channel CH #2 and LUNs 239 #3, 239 #7, 239 #11 and 239 #15.

Figure 3:
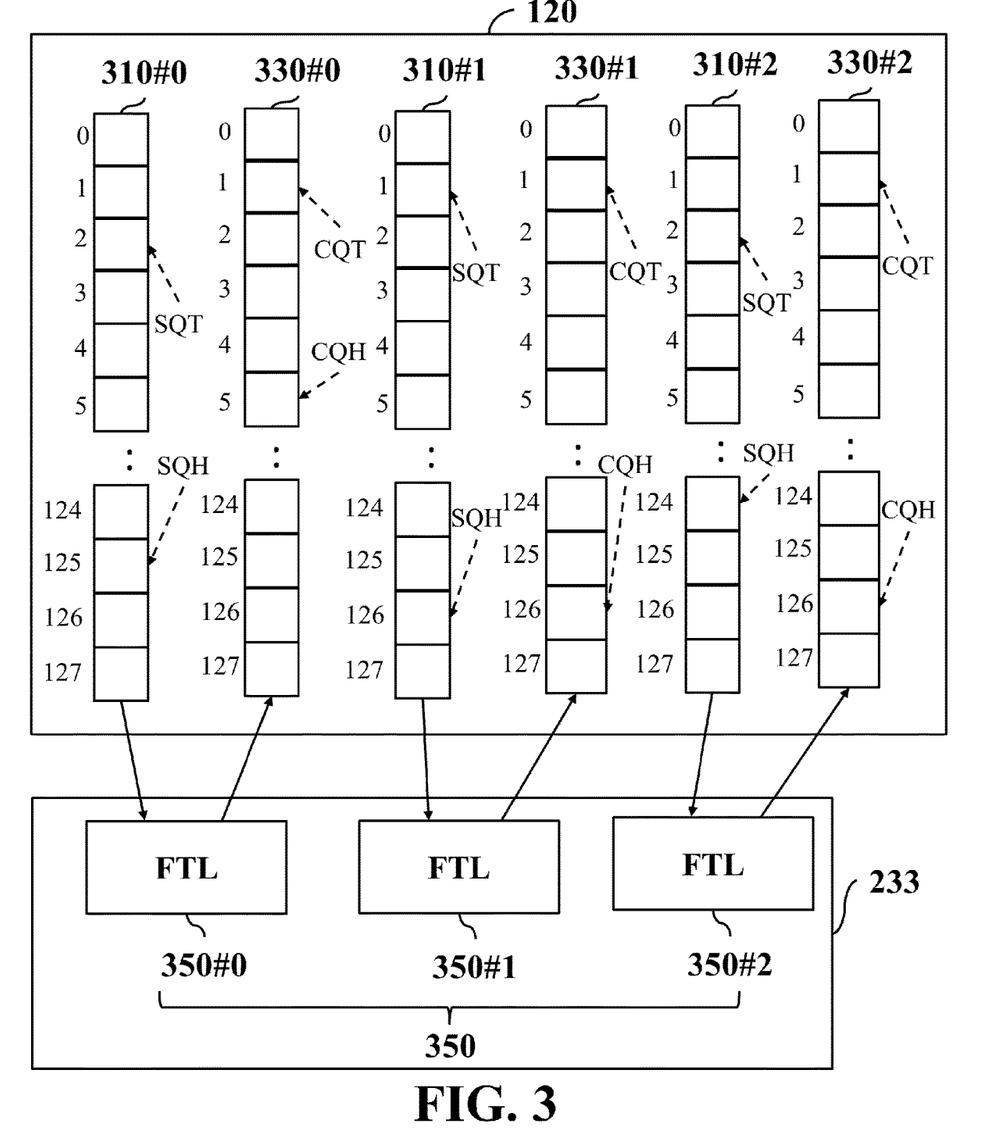
FIG. 3 is a schematic diagram illustrating associations between command queues and Flash Translation Layers (FTLs).

After configuring the channels and the LUNs 239 as multiple sets, the CPU 110 allocates space of the RAM 120 for multiple queue sets and each queue set is associated with one physical-resource set individually. Refer to FIG. 3. For example, the set Set #0 is associated with a Submission (SQ) 310 #0 and a Completion Queue (CQ) 330 #0, the set Set #1 is associated with a SQ 310 #1 and a CQ 330 #1 and the set Set #2 is associated with a SQ 310 #2 and a CQ 330 #2. Each SQ is used to store host commands from the CPU 110, which are read and executed by the storage device 230. Each CQ is used to store Completion Elements (CEs) that are generated by the storage device 230 to show execution results, for example, successes and fails, after the host commands are executed. The CPU 110 may read the CEs to know the execution results of the host commands. Each of the SQs and the CQs contains a collection of entries. Each entry of the SQ may store one host command, specifically one I/O command, such as a read command, a write command, etc. The entries in the collection are kept in order preferably. The principle operations on the collection are the addition of entities to the rear terminal position (for example, the position pointed by a pointer SQT or CQT), known as enqueue, and removal of entities from the front terminal position (for example, the position pointed by a pointer SQH or CQH), known as dequeue. That is, the first command added to the SQ will be the first one to be removed. Thus, the CPU 110 may output multiple 110 commands that can be read and executed by the processing unit 233 and/or flash controller 235 of the storage device 230. After that, the processing unit 233 and/or flash controller 235 of the storage device 230 feedback executions results to make the CPU 110 know the execution results of the I/O commands.

For the configurations supporting multiple sets, the processing unit 233 may activate and execute multiple Firmware Translation Layers (FTLs) individually associated with one set. Refer to FIG. 3. For example, the set Set #0 is associated with the FTL 350 #0, the set Set #1 is associated with the FTL 350 #1 and the set Set #2 is associated with the FTL 350 #2. The FTL 350 is mainly responsible for mapping Logical Block Addresses (LBAs) come from the host 100 to physical addresses of the LUNs 239 (so-called logical-to-physical mapping). All LBAs representing the logical units visible to and managed by the host-side file system are mapped to a physical location (channel ID, block ID, page ID and sector ID) of the LUNs 139. The physical location for an LBA might be dynamically changed in the wear leveling, and other background management algorithms, such as garbage collection (GC), data moving, etc., to improve the endurance of memory cells of the LUNs 239. Although the following takes the FTL 350 #0 as an example, those artisans can apply the relevant techniques to the other FTLs with relevant modifications. In some embodiments, the processing unit 233 when executing the FTL 350 #0 reads (or fetches) the I/O command that is earliest arrived for the set Set #0 from the SQ 310 #0, and drives the flash I/F 237 to manipulate the LUNs 239 via the flash controller 235 according to the parameters (such as an LBA, etc.) of the I/O command, so as to complete an execution of the I/O command. After a completion of the operations, the processing unit 233 when executing the FTL 350 #0 writes a CE into the CQ 330 #0. Lastly, the CPU 110 may read the CE to determine the execution result of the I/O command. In alternative embodiments, for example, in the background mode, the processing unit 233 when executing the FTL 350 #0 may actively drive the flash I/F 237 to manipulate the LUNs 239 via the flash controller 235, so as to complete a specific background operation, such as a wear leveling, a GC, a data moving process, or others.

However, the above design has obvious drawbacks. The processing unit 233 when executing multiple FTLs 350 for accessing to multiple sets not only consumes hardware and software resource but also times spending in FTL loadings and switches between the FTLs 350. To address the drawbacks, the invention discloses a method for processing data, in which a single FTL 350 is executed and managed, multiple sets of variables that are required by the single FTL 350 are set, and each variable set is associated with one physical-resource set. When accessing to the next set, the FTL 350 preserves/updates variables associated with the current set, and then, obtains variables associated with the next set. Therefore, the FTL 350 can use the variables associated with the next set for accessing to the next set. That thus, it can achieve the objective of managing/accessing to multiple sets by a single FTL 350.

To achieve the above objectives, variables associated with the set have to be determined first, and the remaining are variables irrelevant from the set. Variables associated with the set (hereinafter may refer to as variables for brevity) include but not limit to, for example, an active block number, an active page pointer, a spare block amount for each plane, a wear-leveling count for each block and an erase count for each block. Examples of the variable declaration are expressed as follows:

Private garActiveFBlock;
Private garActiveFPage;
Private garSpareFBlock[C_MaxPlane];
Private garWearLevelingCnt[C_MaxBlock];
Private garBlockEraseCnt[C_MaxBlock];

The parameter C_MaxPlane indicates a total amount of data planes of a specific set. The parameter C_MaxBlock indicates a total amount of blocks of a specific set. The parameter garActiveFBlock indicates an active block number of a specific set. The parameter garSpareFBlock[ ] indicates a total amount of spare blocks for each plane of a specific set. The parameter garWearLevelingCnt[ ] indicates a wear-leveling counter for each block of a specific set. The parameter garBlockEraseCnt[ ] indicates an erase counter for each block of a specific set. Since the variables are associated with a particular set, the variables are preferably declared as private variables. But, it is also feasible to declare the variables as public variables.

Figure 4:
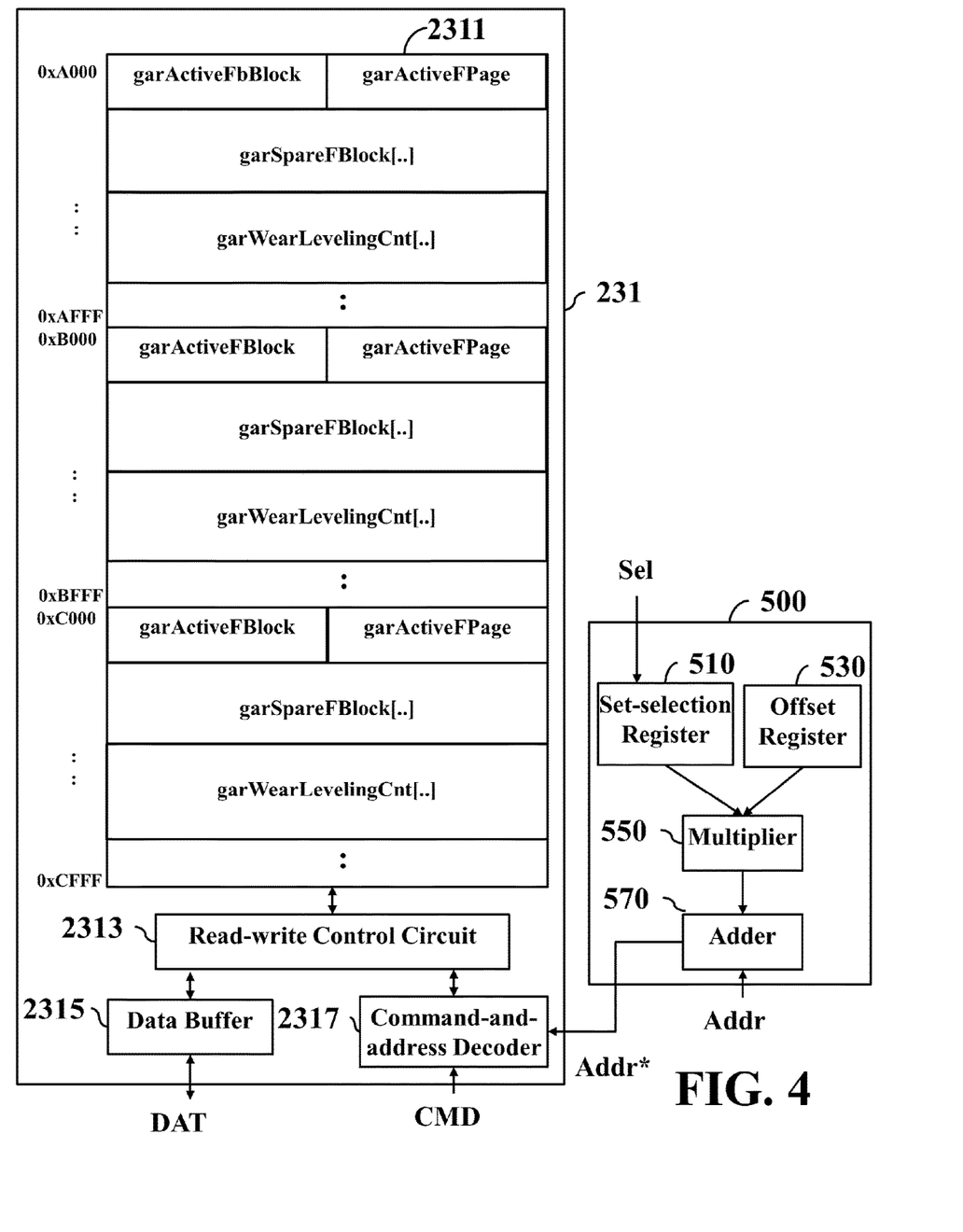
FIGS. 4 and 5 are block diagrams for Random Access Memories (RAMs) and address conversion circuits according to embodiments of the invention.

Next, storage addresses of the variables are determined. The present invention allocates multiple segments of temporary space of the RAM 231 and each segment of the temporary space stores the variables associated with one set. Refer to FIG. 4. For example, the RAM 231 includes a memory unit 2311, in which the variables associated with sets Set #0, Set #1 and Set #2 are stored in temporary space of address ranges 0xA000~0xAFFF, 0xB000~0xBFFF and 0xC000~0xCFFF, respectively.

Lastly, an address conversion circuit 500 is provided in the storage device 230 for converting a memory address that is advised by the FTL 350 to retrieve a variable associated with a specific set into a memory address of specific temporary space. The address conversion circuit 500 is preferably provided in a memory controller 236. In some embodiments, the address conversion circuit 500 may be practiced in the architecture as shown in FIG. 4. The address conversion circuit 500 may use the equation (1) to convert a memory address that an FTL attempts to retrieve into a relative address Addr* of temporary space corresponding to a specific set:

$$Addr^* = Addr + SET^*OFFSET$$

The parameter Addr indicates a memory address that an FTL attempts to be written into or read from. The parameter SET indicates a set number stored in a set-selection register 510. The parameter OFFSET indicates a value stored in an offset register 530, indicating a total length of memory space that is allocated for each set. The processing unit 233 when executing the FTL 350 sets the value of the set-selection register 510 to a number of the corresponding set. For example, before accessing to the RAM 231, the FTL in execution stores "0", "1" or "2" in the set-selection register 510. A default value may be stored in the offset register 530 before the storage device 230 leaves from a manufacturing factory or when a boot process of the storage device 230 is executed. A multiplier 550 coupled to the set-selection register 510, the offset register 530 and the adder 570 times the value of the set-selection register 510 by the value of the offset register 530 and outputs the calculation result to an adder 570. The adder 570 coupled to the processing unit 233 receives the memory address Addr that the FTL 350 attempts to retrieve from the processing unit 233, and pluses the calculation result output from the multiplier 550 to the memory address Addr to generate a relative address Addr*. The memory controller 236 outputs the relative address Addr* to the RAM 231.

The RAM 231 includes a command-and-address decoder 2317 coupled to the memory controller 236. The command-and-address decoder 2317 receives a command CMD issued by the FTL 350 from the memory controller 236, receives the relative address Addr* from the memory controller 236 and interprets the received command CMD and the relative address Addr*. The RAM 231 further includes a read-write control circuit 2313 and a data buffer 2315. The read-write control circuit 2313 is coupled to the memory unit 2311 and the command-and-address decoder 2317 and the data buffer 2315 is coupled to the read-write control circuit 2313 and the processing unit 233. The read-write control circuit 2313 receives a read command and a read address from the command-and-address decoder 2317, reads a specified length of data from the read address (or referred to as a start address) of the memory unit 2311 and outputs the data to the data buffer 2315, enabling the processing unit 233 when executing the FTL 350 to obtain a designated variable value DAT from the data buffer 2315. In addition, the read-write control circuit 2313 receives a write command and a write address from the command-and-address decoder 2317, reads a designated variable value DAT that the processing unit 350 when executing the FTL 350 attempts to write from the data buffer 2315, and writes the variable value DAT into the write address of the memory unit 2311.

Figure 5:
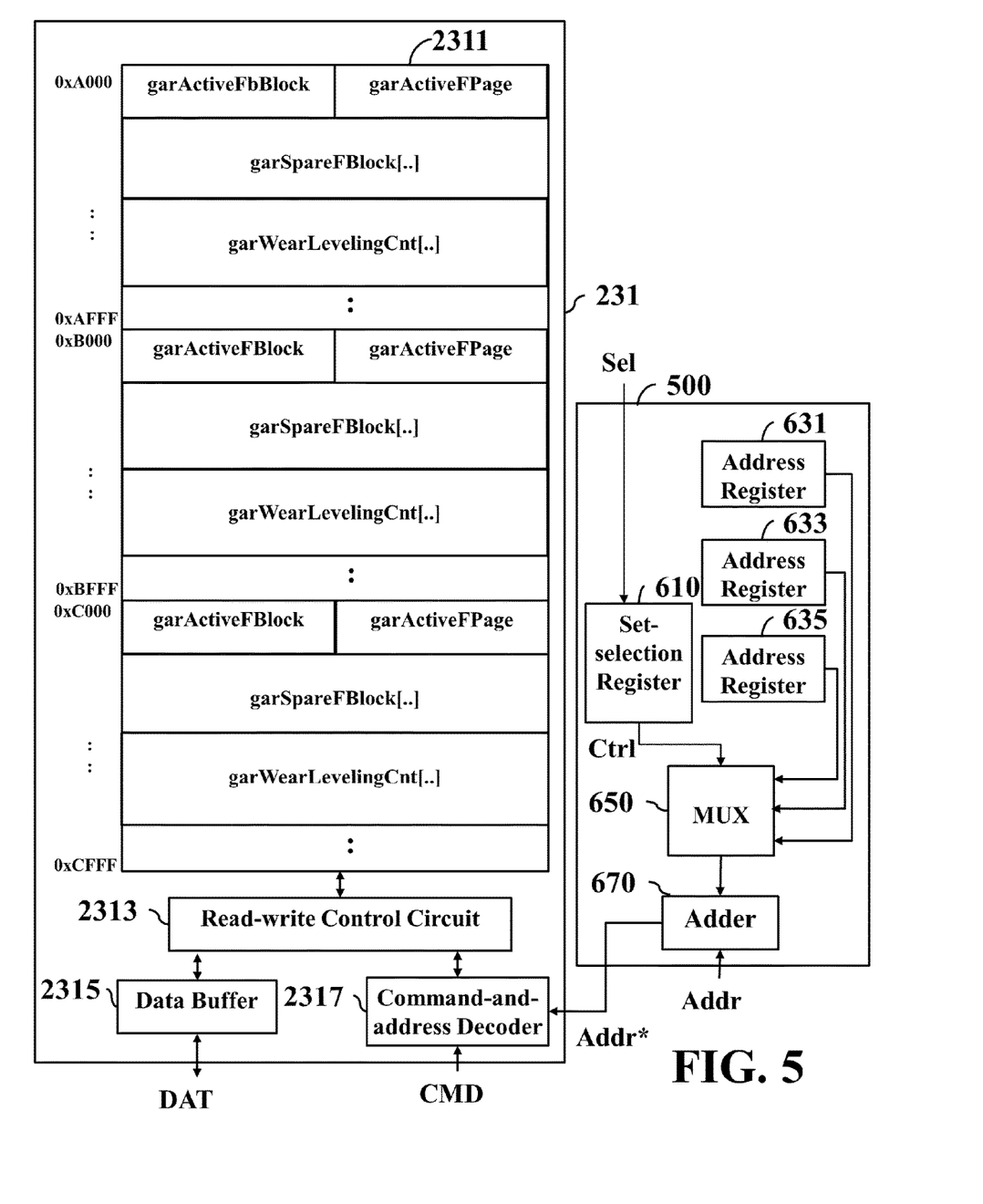

In alternative embodiments, the address conversion circuit 500 may be practice in the architecture as shown in FIG. 5. Refer to FIG. 5. The set-selectin register 610 is similar with the set-selection register 510 as shown in FIG. 4 to store a number of the corresponding set by the FTL 350 in execution. The address conversion circuit 500 further includes multiple address registers and each address register stores a start address of the variables corresponding to one set. For example, the first to third address registers 631, 633 and 635 store starting addresses "0xA0000", "0xB0000" and "0xC0000" for the variables of the sets Set #0, Set #0 and Set #2, respectively. Default values may be stored in the first to third address registers 631, 633 and 635 before the storage device 230 leaves from a manufacturing factory or when a boot process of the storage device 230 is executed. The address conversion circuit 500 further includes a multiplexer (MUX) 650 coupled to the first to third address registers 631, 633 and 635, the set-selection register 610 and an adder 670 for connecting one of the first to third address registers 631, 633 and 635 to the adder 670 according to a control signal Ctrl corresponding to the value of the set-selection register 610. For example, when the value of the set-selection register 610 is "0", the MUX 650 connects the first address register 631 to the adder 670. When the value of the set-selection register 610 is "1", the MUX 650 connects the second address register 633 to the adder 670, and so on. The adder 670 coupled to the processing unit 233 receives the memory address Addr that the FTL 350 attempts to retrieve from the processing unit 233 and pluses the starting address output from the MUX 650 to the memory address Addr to generate a relative address Addr*. The memory controller 236 outputs the relative address Addr* to the RAM 231.

In the address conversion circuit 500 as shown in either FIG. 4 or FIG. 5, for example, the memory controller 236 outputs the relative address "0xA010" to the RAM 231 when the FTL 350 stores "0" in the set-selection register 510 or 610 and sends the memory address "0x0010". The memory controller 236 outputs the relative address "0xB010" to the RAM 231 when the FTL 350 stores "1" in the set-selection register 510 or 610 and sends the memory address "0x0010". The memory controller 236 outputs the relative address "0xC010" to the RAM 231 when the FTL 350 stores "2" in the set-selection register 510 or 610 and sends the memory address "0x0010".

Figure 6:
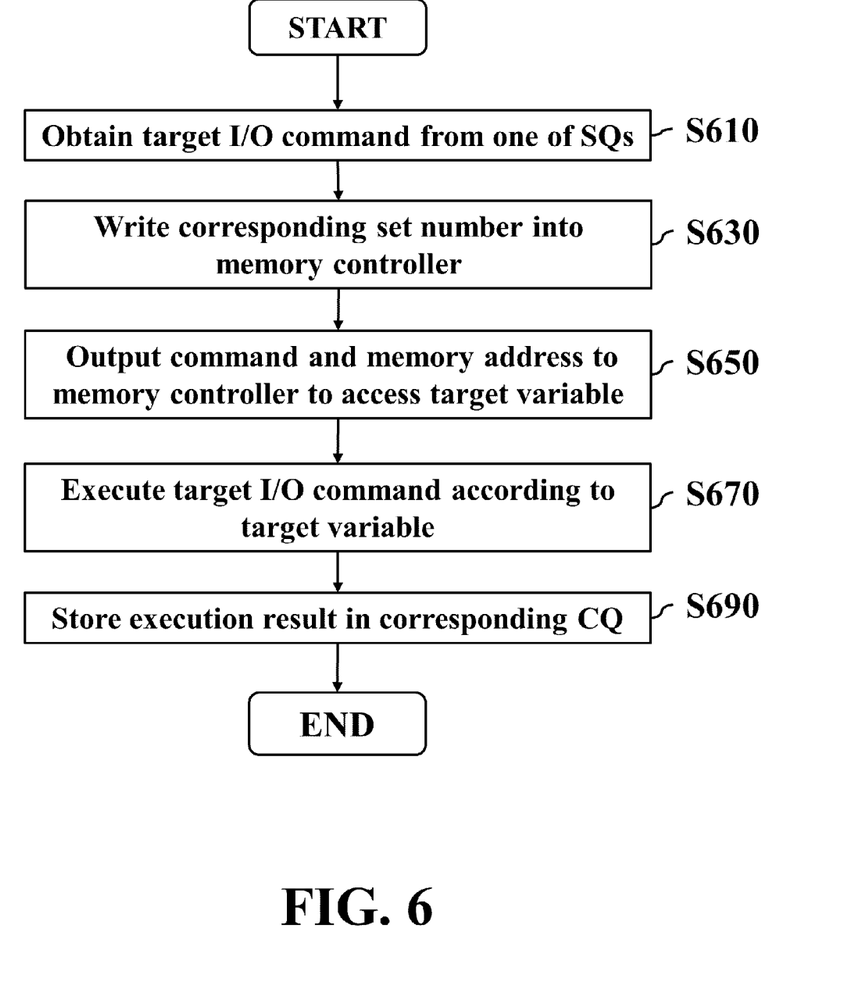
FIG. 6 is a flowchart illustrating a method for processing data according to an embodiment of the invention.

With reflection of the address conversion circuit 500 as shown in FIG. 4 or FIG. 5, FIG. 6 illustrates an embodiment of a method for processing data, which is performed by the processing unit 233 when loading and executing program code of the FTL 350.

Step S610: The processing unit 233 obtains a target I/O command from one of SQs individually associated with one set. For example, the SQ 310 #0 is associated with the set Set #0, the SQ 310 #1 is associated with the set Set #1 and the SQ 310 #2 is associated with the set Set #2. The processing unit 233 when executing the FTL 350 reads one I/O command or more associated with the set Set #0 from the SQ 310 #0 as the target I/O command or commands, reads one I/O command or more associated with the set Set #1 from the SQ 310 #1 as the target I/O command or commands, or reads one I/O command or more associated with the set Set #2 from the SQ 310 #2 as the target I/O command or commands. The FTL 350 preferably reads the I/O commands of different sets from the 310 #0, 310 #1 and 310 #2 in the round-robin manner. Or, the FTL 350 determines the reading order and the quantities of I/O commands from the SQ 310 #0, 310 #1 and 310 #2 according to weight settings. The FTL 350, for example, cyclically reads one, two and three I/O commands associated with sets Set #0, Set #1 and Set #2 from the SQs 310 #0, 310 #1 and 310 #2 as the target I/O commands, respectively.

Step S630: The processing unit 233 writes the set number corresponding into the read SQ in the memory controller 236. For example, the processing unit 233 when executing the FTL 350 reads the target I/O command associated with the set Set #0 from the SQ 310 #0, and then, writes "0" into the set-selection register 510 or 610 of the memory controller 236.

Step S650: The processing unit 233 outputs a command and a memory address Addr to the memory controller 236 to access a target variable. Since the processing unit 233 writes "0" into the set-selection register 510 or 610 of the memory controller 236, the memory controller 236 converts the memory address Addr into the relative address Addr*, thereby enabling the processing unit 233 to access the target variable associated with the set Set #0 that is stored at the relative address Addr* of the RAM 231 via the memory controller 236. In other words, the FTL 350 may read the variable value associated with the set Set #0 from the relative address Addr* of the RAM 231 or write the variable value associated with the set Set #0 into the relative address Addr* of the RAM 231.

Step S670: The processing unit 233 executes the target I/O command according to the target variable. After obtaining the target variable, the FTL 350 can execute target I/O command or update the target variable correctly. For example, the processing unit when executing the FTL 350 performs data reads from the LUNs 230 #0~1 or data writes into the LUNs 230 #4~5 according to the variables associated with the set Set #0.

Step S690: The processing unit 233 writes an execution result of the target I/O command into the CQ corresponding to the read SQ. For example, the processing unit 233 when executing the FTL 350 writes a CE indicating an execution success into the CQ 330 #0 in response to successful data reads from the LUNs 239 #0~1. The CPU 110 reads the CE from the CQ 330 #0 and knows the execution result of the I/O command of the SQ 310 #0.

Some or all of the aforementioned embodiments of the method of the invention may be implemented in a computer program such as a driver for a dedicated hardware of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1, 2, 4 and 5, it should be noted that additional elements may be included to achieve better performance without departing from the spirit of the invention. Each element of FIGS. 1, 2, 4 and 5 is composed of various circuits and arranged to operably perform the aforementioned operations. While the process flows described in FIG. 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for handling flash physical-resource sets, comprising:
a random access memory (RAM), comprising a plurality of segments of temporary space, wherein each segment of temporary space stores variables associated with a specific flash physical-resource set;
a processing unit, coupled to the RAM, arranged to operably access user data of a flash physical-resource set when executing program code of a Flash Translation Layer (FTL); and
an address conversion circuit, coupled to the RAM, arranged to operably receive a memory address issued from the FTL, convert the memory address into a relative address of one segment of temporary space associated with the flash physical-resource set and output the relative address to the RAM for accessing a variable of the associated segment of temporary space,
wherein the address conversion circuit comprises:
a set-selection register;
a multiplier, coupled to the set-selection register, arranged to operably time a value of the set-selection register by a total length of temporary space that is allocated for each flash physical-resource set to generate a calculation result; and
an adder, coupled to the multiplier, arranged to operably plus the calculation result to the memory address to generate the relative address and output the relative address to the RAM.

2. The apparatus of claim 1, wherein the address conversion circuit comprises:
an offset register, coupled to the multiplier, arranged to operably store the total length of temporary space that is allocated for each flash physical-resource set,
wherein the FTL sets a number corresponding to the associated flash physical-resource set to the set-selection register before accessing to the RAM.

3. The apparatus of claim 1, wherein each flash physical-resource set comprises a portion of channels and a portion of Logical Unit Numbers (LUNs).

4. The apparatus of claim 1, comprising:
a flash interface, coupled to the processing unit,
wherein the FTL drives the flash interface to access user data of the flash physical-resource set according to the accessed variable.

5. The apparatus of claim 4, wherein the user data is accessed during a performance of an operation being associated with an I/O command read from a submission queue, or being a background operation irrelevant from a host.

6. A method for handling flash physical-resource sets, performed by a processing unit when loading and executing program code of a flash translation layer, comprising:
during a performance of an operation, after writing a number corresponding to a physical-resource set into a set-selection register of an address conversion circuit, sending a memory address for a variable value to be read or written into the address conversion circuit, thereby enabling the address conversion circuit to convert the memory address into a relative address corresponding to allocated space for the physical-resource set and output the relative address to a random access memory (RAM); and reading the variable value from the relative address of the RAM, or writing the variable value into the relative address of the RAM,
wherein the address conversion circuit comprises:
the set-selection register, arranged to operably store the number corresponding to the physical-resource set;
a multiplier, coupled to the set-selection register, arranged to operably time the number corresponding to the physical-resource set by a total length of temporary space that is allocated for each physical-resource set to generate a calculation result; and
an adder, coupled to the multiplier, arranged to operably plus the calculation result to the memory address to generate the relative address and output the relative address to the RAM.

7. The method of claim 6, wherein the operation is associated with an I/O command read from a submission queue, or is a background operation irrelevant from a host.

8. The method of claim 6, wherein the RAM comprises a plurality of segments of temporary space and each segment of temporary space stores variables associated with a specific flash physical-resource set.

9. The method of claim 6, comprising:
during the performance of the operation, driving a flash interface to access user data of the physical-resource set according to the variable value.

10. The method of claim 6, wherein the address conversion circuit comprises:
an offset register, coupled to the multiplier, arranged to operably store the total length of temporary space that is allocated for each physical-resource set.

11. The method of claim 6, wherein each physical-resource set comprises a portion of channels and a portion of Logical Unit Numbers (LUNs).

12. A non-transitory computer program product for handling flash physical-resource sets when executed by a processing unit, the non-transitory computer program product comprising program code of a flash translation layer (FTL) to:
during a performance of an operation, after writing a number corresponding to a physical-resource set into a set-selection register of an address conversion circuit, send a memory address for a variable value to be read or written into the address conversion circuit, thereby enabling the address conversion circuit to convert the memory address into a relative address corresponding to allocated space for the physical-resource set and output the relative address to a random access memory (RAM); and read the variable value from the relative address of the RAM, or writing the variable value into the relative address of the RAM,
wherein the address conversion circuit comprises:
the set-selection register, arranged to operably store the number corresponding to the physical-resource set;
a multiplier, coupled to the set-selection register, arranged to operably time the number corresponding to the physical-resource set by a total length of temporary space that is allocated for each physical-resource set to generate a calculation result; and
an adder, coupled to the multiplier, arranged to operably plus the calculation result to the memory address to generate the relative address and output the relative address to the RAM.

13. The non-transitory computer program product of claim 12, wherein the operation is associated with an I/O command read from a submission queue, or is a background operation irrelevant from a host.

14. The non-transitory computer program product of claim 12, wherein the RAM comprises a plurality of segments of temporary space and each segment of temporary space stores variables associated with a specific flash physical-resource set.

15. The non-transitory computer program product of claim 12, comprising program code of the FLT to:
during the performance of the operation, drive a flash interface to access user data of the physical-resource set according to the variable value.

16. The non-transitory computer program product of claim 12, wherein the address conversion circuit comprises:
an offset register, coupled to the multiplier, arranged to operably store the total length of temporary space that is allocated for each physical-resource set.

17. The non-transitory computer program product of claim 12, wherein each physical-resource set comprises a portion of channels and a portion of Logical Unit Numbers (LUNs).

* * * * *